Oct. 11, 1966   H. HARTWIG   3,277,780
APPARATUS FOR STRIP-BY-STRIP RECTIFICATION OF PHOTOGRAMS
Filed Jan. 13, 1965

INVENTOR
HORST HARTWIG

United States Patent Office 3,277,780
Patented Oct. 11, 1966

3,277,780
APPARATUS FOR STRIP-BY-STRIP RECTIFICATION OF PHOTOGRAMS
Horst Hartwig, Jena, Germany, assignor to VEB Carl Zeiss Jena, Jena, Germany
Filed Jan. 13, 1965, Ser. No. 425,351
1 Claim. (Cl. 88—24)

This invention relates to an apparatus for strip-by-strip rectification of photograms of the kind comprising an image plane, a projection plane, a diaphragm for limiting the projection ray-path, and means producing at least two relative motions of the diaphragm and the projection plane along the direction of the strips and at right angles thereto, one strip being rectified in the forward and the adjacent strip in the return motion.

Differential rectification of photograms is effected by scanning the photogram strip by strip through and at right angles to a slot and producing a differentially rectified photogram image on a light-receptive layer in the projection plane, it being immaterial whether the relative motions of slot and projection plane are due to displacement of the one or the other or both in their respective planes.

In the known differential rectifiers, the relative motions of slot and projection plane along each strip take place twice, once for the rectification proper and again for returning the slot or the projection plane to zero position, displaced by the breadth of one strip. Differential rectifiers operating in this manner only are not economic in that every rectification of a strip must needs be followed up by the time-consuming return to zero position.

To obviate this disadvantage, a rectifier has been proposed in which differential rectification can take place in both the forward and the return motion. Experiments have proved however that inherent play in the apparatus gives rise to mutual displacement of two adjacent strips, which decreases the quality of the rectified projection and may be so pronounced as to render the projection useless for aerophotographic mapping.

Also it is well known in the art that photographic reproductions can be transformed by means of plane-parallel glass plates cardanically suspended in the projection ray-path. While the transformation takes place, the inclination angles of these plates are subject to a continuous change, the plates themselves being transformation agents.

It is an object of the present invention to obviate the foregoing disadvantages and to provide an apparatus for strip-by-strip rectification of photograms in which the rectification of a photogram takes place strip by strip in both the forward and the return motion and in which the strips rectified in the forward motion are not dislocated relatively to the strips rectified in the return motion.

To this end, the present invention consists in an apparatus for strip-by-strip rectification of photograms of the kind hereinbefore set forth, wherein means are provided for shifting from one rectification strip to the adjacent one by causing the projection plane and the projected photogram to be displaced relatively to each other by a constant value along the direction of the strips. This value of the displacements depends on the image scale and the magnitudes of the relative motions of projection plane and projected photogram per unit of time. The shifting means can be either mechanic or electric or optical. The image scale of the projection system is continuously changeable.

A mechanical means for effecting the shifting may comprise a planetary gearing which is connected to a spindle controlling the relative motions of projection plane and projected photogram. When the driving sun-wheel is motionless, the driven sun-wheel receives from the rotating planet pinions a predetermined rotation.

An example for electrical shifting means may comprise a differential rotating-field remote-signalling system which imparts additional movements to the elements producing the relative motions.

Preferably, optical shifting means are employed comprising for example a plane-parallel glass plate which lies in the projection ray-path and, for best possible dimensioning, near the diaphragm.

Compared with purely mechanic or purely electric means, which require the image plane or projection plate to be located at a certain additional distance from where rectification takes place, thus making the construction of the apparatus very bulky, purely optical means have the advantage of very little additional material and a comparatively simple setup because there is nothing to take up space. The optical means impart additional displacement along strip direction only to the projected photogram.

It is self-evident that mechanic, electric and optical means in some suitable manner can be used in combination with each other.

In order that the invention may be more readily understood, reference is made to the accompanying drawing which illustrates diagrammatically and by way of example two embodiments thereof, and in which FIG. 1 shows one embodiment having mechanical shifting means;

Figure 1:
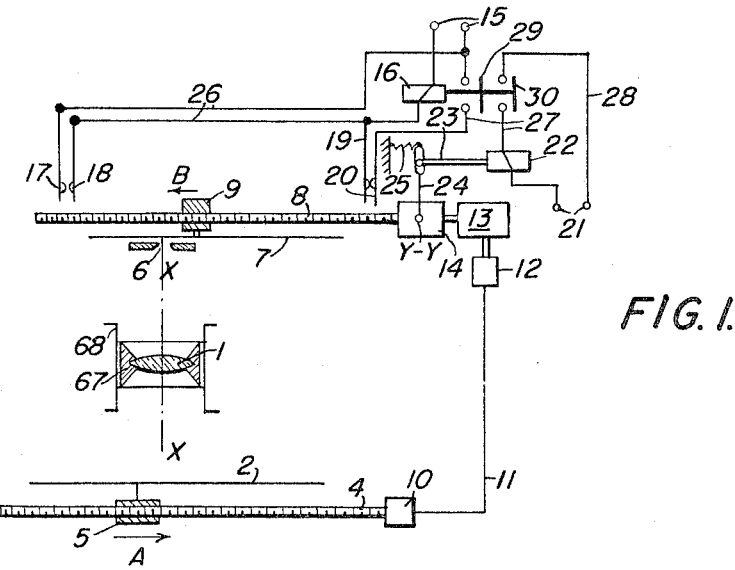

Referring to FIG. 1 of the drawing, the carrier 2 of a photogram to be rectified is located on the object side of an objective 1 having an optical axis X—X. The objective 1 is set in a mount 67 displaceable along a stationary guide spindle 8. A motor 3 operates a spindle 4 which engages a traveling nut 5 fast with the carrier 2. A slot 6 lies on the image side of the objective 1 and on the object side of a record support 7 fast with a locked nut 9 travelling along a spindle 8. The spindles 4 and 8 are cinematically interconnected by a signal transmitter 10, a conductor 11, a signal receiver 12, a change-over gear 13 and a compensator 14.

A relay 16 and two pairs of contact springs 17, 18 and 19, 20 are connected to a voltage source 15. The relay 16 lies in a circuit 26 containing the contact springs 17, 18 and lies in a circuit 27 containing the contact springs 19, 20. The spring 18 of the one and the spring 20 of the other pair are extended in length to serve as stops for the nut 9 travelling along the spindle 8. An electromagnet 22 is connected to a voltage source 21 and through an intermediate member 23 to the one end of a lever 24 rotatable about an axis Y—Y. The other end of the lever 24 is linked to the compensator 14 positively coupled to the spindle 8. A circuit 28 fed by the voltage source 21 can, like circuit 27, be interrupted by the relay 16 and can be interrupted by means of contacts 29 and 30. The ends of a coil spring 25 are respectively connected to a stationary part of the apparatus and that end of the lever 24 which is fast with the intermediate member 23. The spring 25 counteracts the electromagnet 22.

At right angles to the optical axis X—X and along the direction indicated by an arrow A, the spindle 4 actuated by the motor 3 displaces the nut 5 with the carrier 2 and the photogram to be rectified and imparts equal rotations to the signal transmitter 10. The electric wire 11 imparts the rotations of the signal transmitter 10 to the signal receiver 12, which in its turn transmits these rotations to the change-over gear 13. The change-over gear 13 according to the ratio of the photographic focal length to the rectification focal length steps these rotations up or down and transmits them to the spindle 8. The spindle 8 displaces the nut 9 and the record support 7 at right angles to the optical axis X—X and parallel to the stationary slot 6 in the direction indicated by an arrow B. One strip of the photogram on the carrier 2 is thus rectified, and the objective 1 projects an image of this rectified strip on the record support 7, where this image is photographed.

Figure 4:
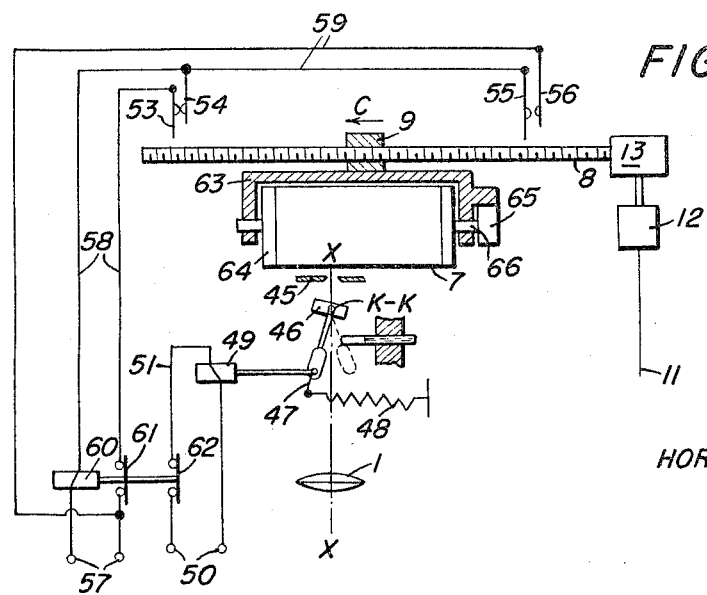
FIG. 4 shows another embodiment having optical shifting means.

At the end of the rectification strip, the nut 9 urges the contact spring 18 against the contact spring 17. In consequence thereof, the circuit 26 is momentarily closed, the relay 16 closes the contacts 29 and 30 and, accordingly, the circuits 27 and 28. The electromagnet 22 is thus caused to operate, the intermediate member 23 acts against the spring 25 and alters the inclination of the lever 24, the spindle 8 and the record support 7 receiving a momentary additional motion along the direction of the strips. Moreover, at this moment the displacement of the record support 7 causes the strip to be exchanged for the adjacent one, the change taking place at right angles to the plane of the drawing (FIG. 1), and the reversal of the direction of rotation of the motor 3 causes the scanning direction to be reversed by 180°. The means for displacing the record support 7 are shown in FIG. 4.

For the rectification of the said adjacent strip the nut 9 is actuated in the same manner as before until it urges against the contact spring 20, disconnecting it from the contact spring 19, so that the circuit 27 is interrupted and the relay 16 is released, the consequence being an opening of the contacts 29 and 30. This means that the circuit 28 is interrupted, that the electromagnet 22 ceases to operate and the spring 25 causes the lever 24 to reassume the position illustrated in the drawing, and that the compensator 14 (which will be more fully described hereinafter) imparts to the spindle 8 and record support 7 a momentary additional motion along the direction of the strips, which motion is reverse to that imparted to the spindle 8 at the other end of the strips.

The above-described rectification process in two consecutive directions differing by 180° is repeated until the entire photogram has been differentially rectified strip by strip.

Figures 2, 3:
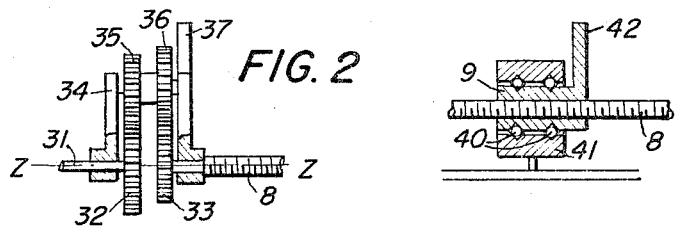
FIGS. 2 and 3 show these mechanical means in detail.

The compensator 14 shown schematically in FIG. 1, is illustrated in FIG. 2 as a planet gearing, it being understood however that the compensator may be of any other suitable construction. To a shaft 31 and the spindle 8 are respectively keyed sun-wheels 32 and 33. The sun-wheels 32 and 33 are in engagement with each other through rigidly interconnected planet pinions 35 and 36 mounted in a bracket 34 and having different diameters. The bracket 34 by means of a lever 37 integral with it, can be rotated through any desired angle about the shaft 31 and the spindle 8, which are coaxial with each other. The lever 37 is operated by a magnet similar to the magnet illustrated in FIG. 1. When the sun-wheel 32 is motionless, the sun-wheel 33 is rotatable by means of the bracket 34.

In FIG. 3, the spindle 8 engages the nut 9 on which a ring 41 rigidly connected to the record support is mounted by means of balls 40. Fast with the ring 41 is a lever 42 which between two variable stops (not shown) is rotatable through given angles, so that the nut 9 and the record support can be displaced parallel to the spindle 8.

FIG. 4, like FIG. 1, shows the objective 1 having the optical axis X—X at right angles to the record support 7, and the nut 9 in mesh with the spindle 8 which through the electric wire 11, the signal receiver 12 and the change-over gear 13 is actuated by a spindle (not shown) allotted to the photogram. The photogram carrier and the means operating it are omitted in FIG. 4 for the sake of simplicity.

The nut 9 is fast with a bearing body 63 (FIG. 4) of a roller 64 on which the record support 7 is spread out. By means of a shaft 66, an electromotor 65 fast with the bearing body 63 rotates the roller 64 about an axis parallel to that of the spindle 8. This rotation, which takes place only when the nut 9 is at one of its reversal points, shifts the record support 7 an amount equal to the breadth of a rectified strip.

Unlike the compensator shown in FIG. 1, the compensator in FIG. 4 is no mechanical device between change-over gear 13 and spindle 8, but an optical device. The projection ray-path between objective 1 (FIG. 4) and record support 7 contains, in addition to a diaphragm 45, a plane-parallel glass plate 46 which is fast with the one end of the lever 47 and rotatable about an axis K—K at right angles to the plane of the drawing. The other end of the lever 47 is fast with a tension spring 48 and actuated by an electromagnet 49 lying in a circuit 51 containing a voltage source 50. The angle of rotation of the glass plate 46 is limited by a corresponding adjustment of the electromagnet 49 and by an adjustable stop 52.

Two pairs of contact springs 53, 54 and 55, 56 are respectively located at the two reversal points of the nut 9. The springs 53 and 55 are elongated to serve as stops for the nut 9 travelling along the spindle 8. The pair of springs 53, 54 lie in a circuit 58 containing a voltage source 57. The contact of the springs 53 and 54 with each other is interrupted only when the nut 9 at the one reversal point removes the spring 53 from the spring 54. The pair of springs 55, 56 lie in a circuit 59 containing the voltage source 57 and contact each other only when the nut 9 at the other reversal position urges the contact spring 55 against the contact spring 56.

The two circuits 58 and 59 through a relay 60 act on two contacts 61 and 62 lying respectively in the circuits 58 and 51. In FIG. 4, the contacts 62 and 61 close respectively the circuits 51 and 58, the electromagnet 49 attracts the lever 47 against the traction of the spring 48, causing the lever 47 and the glass plate 46 to rotate through a predetermined angle, in consequence of which the projection ray pencil near the axis X—X is displaced parallel to itself. The nut 9 travels in the direction of an arrow C to the reversal point in the left of the drawing and breaks the contact of the springs 53 and 54, so that the circuit is interrupted and the relay 60 released. The circuits 58 and 51 are opened by disengagement of the contacts 61 and 62. The electromotor 49 being currentless, the spring 48 pulls the lever 47 into the position shown in dash-lines so that it lies against the stop 52, the plane-parallel glass plate 46 being swung into an inversely equal position with respect to the axis X—X. The relay 60 attracts and thus closes the contacts 61 and 62 only when the nut 9 by a corresponding rotation of the spindle 8 is displaced along the direction inverse to that of the arrow C and is urged against the spring 55, so that the springs 55 and 56 momentarily contact each other. In all other respects, the mode of operation corresponds to that described with reference to FIG. 1.

Instead of obtaining relative to-and-fro motion of projected photogram and record support 7 by displacements of photogram carrier 2 and record support 7, it is possible, according to a further embodiment of the invention, to make the carrier 2 and the support 7 stationary and to provide that the objective 1 and the slot 6 or the diaphragm 45 are displaceable parallel to the photogram. In a still further embodiment of the invention, the objective 1 is stationary and the carrier 2 and the support 7 are displaceable along the optical axis X—X.

The projected photogram and the support 7 can effect the necessary relative transverse motion if the support 7 is spread out on the roller 64 (as in FIG. 4) or if a corresponding system of cross slides (not shown) is used. Finally, provision can be made that all or part of the mechanically introduced motion is fed into the apparatus by hand operation.

I claim:

An apparatus for strip-by-strip rectification of photograms comprising a photogram carrier, a record support, an objective for projection of the photogram onto said record support, a diaphragm for limiting the projection ray-path, means for continuously changing the distance apart of said objective and said photogram support and the distance apart of said objective and said record support, means for producing a relative to-and-fro motion of said record support and the projection of said photogram, means for producing a relative intermediate motion, said intermediate motion being at right angles to and taking place at every reversal of said to-and-fro motion and corresponding in magnitude to the diameter of the ray beam traversing said diaphragm and striking said record support, each of said motions being parallel to the photogram, and means for producing a constant relative displacement of said projection and said support at the moments of the reversals, said displacement being additional to and taking place along the same directions as said to-and-fro motion.

No references cited.

NORTON ANSHER, *Primary Examiner.*